United States Patent
Moroney et al.

(10) Patent No.: US 9,148,423 B2
(45) Date of Patent: Sep. 29, 2015

(54) PERSONAL IDENTIFICATION NUMBER (PIN) GENERATION BETWEEN TWO DEVICES IN A NETWORK

(75) Inventors: Paul Moroney, Olivenhain, CA (US); Jiang Zhang, La Jolla, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 1531 days.

(21) Appl. No.: 12/345,010

(22) Filed: Dec. 29, 2008

(65) Prior Publication Data

US 2010/0169399 A1 Jul. 1, 2010

(51) Int. Cl.
| | |
|---|---|
| G06F 21/00 | (2013.01) |
| H04L 9/32 | (2006.01) |
| H04L 29/06 | (2006.01) |
| G06F 7/04 | (2006.01) |
| G06F 15/16 | (2006.01) |
| G06F 17/30 | (2006.01) |
| H04N 21/4363 | (2011.01) |
| H04N 21/426 | (2011.01) |
| H04N 21/436 | (2011.01) |
| H04W 4/08 | (2009.01) |

(52) U.S. Cl.
CPC ............ H04L 63/083 (2013.01); H04L 63/065 (2013.01); H04N 21/42684 (2013.01); H04N 21/43615 (2013.01); H04N 21/43637 (2013.01); H04W 4/08 (2013.01)

(58) Field of Classification Search
CPC ......... G06F 21/30; G06F 21/36; G06F 21/44; G06F 2221/2133; H04L 2209/80; H04L 63/083; H04L 9/0869; H04N 21/43637; H04W 12/06; H04W 4/06
USPC .......... 713/171, 184, 168, 7; 709/25
See application file for complete search history.

(56) References Cited

U.S. PATENT DOCUMENTS

| | | | |
|---|---|---|---|
| 5,903,651 A * | 5/1999 | Kocher | ......... 713/158 |
| 5,909,183 A | 6/1999 | Borgstahl et al. | |
| 6,084,512 A | 7/2000 | Elberty et al. | |

(Continued)

FOREIGN PATENT DOCUMENTS

| | | |
|---|---|---|
| CN | 1221915 A | 7/1999 |
| CN | 101179380 A | 5/2008 |

(Continued)

OTHER PUBLICATIONS

PCT Search Report & Written Opinion, Re: Application #PCT/US2009/066174 Jun. 23, 2010.

(Continued)

*Primary Examiner* — Michael Chao
*Assistant Examiner* — Feliciano Mejia
(74) *Attorney, Agent, or Firm* — Fox Rothschild LLP

(57) ABSTRACT

A method of generating a Personal Identification Number (PIN) between a first device and a second device in a network is provided. The method includes securely receiving information of input choices of the second device and random numbers assigned to the input choices at the first device. At the first device, the PIN is generated from the random numbers, and instructions are provided directing an entry of the input choices on the second device. At the second device, the input choices are entered. The second device is operable to generate the PIN from the input choices and the random numbers if the input choices are entered as instructed.

17 Claims, 3 Drawing Sheets

(56) References Cited

U.S. PATENT DOCUMENTS

| | | | |
|---|---|---|---|
| 6,199,136 B1 | 3/2001 | Shteyn | |
| 6,591,364 B1 | 7/2003 | Patel | |
| 6,741,852 B1 | 5/2004 | Mohrs | |
| 6,826,607 B1 | 11/2004 | Gelvin et al. | |
| 6,983,370 B2* | 1/2006 | Eaton et al. | 713/182 |
| 6,995,655 B2 | 2/2006 | Ertin et al. | |
| 7,020,121 B2 | 3/2006 | Hardacker et al. | |
| 7,092,670 B2* | 8/2006 | Tanaka et al. | 455/7 |
| 7,430,758 B2 | 9/2008 | Toutonghi | |
| 7,511,762 B2 | 3/2009 | Elnathan et al. | |
| 7,511,765 B2 | 3/2009 | Ono | |
| 7,613,426 B2* | 11/2009 | Kuehnel et al. | 455/41.2 |
| 7,912,076 B2 | 3/2011 | Kim et al. | |
| 8,001,381 B2 | 8/2011 | Metke et al. | |
| 8,001,584 B2 | 8/2011 | Lortz et al. | |
| 8,014,355 B2 | 9/2011 | Koga | |
| 8,185,049 B2 | 5/2012 | Zhang et al. | |
| 8,189,627 B2* | 5/2012 | Xia et al. | 370/535 |
| 8,239,551 B2 | 8/2012 | Oda et al. | |
| 8,276,209 B2* | 9/2012 | Knibbeler et al. | 726/30 |
| 8,869,238 B2* | 10/2014 | Gopalakrishna | 726/3 |
| 2002/0037708 A1 | 3/2002 | McCann et al. | |
| 2002/0061748 A1 | 5/2002 | Nakakita et al. | |
| 2002/0077077 A1 | 6/2002 | Rezvani et al. | |
| 2002/0157002 A1 | 10/2002 | Messerges et al. | |
| 2003/0045280 A1 | 3/2003 | Simons | |
| 2003/0095521 A1 | 5/2003 | Haller et al. | |
| 2005/0014503 A1 | 1/2005 | Nakakita et al. | |
| 2005/0210261 A1 | 9/2005 | Kamperman et al. | |
| 2006/0105712 A1 | 5/2006 | Glass et al. | |
| 2006/0116107 A1 | 6/2006 | Hulvey | |
| 2006/0156340 A1 | 7/2006 | Choi | |
| 2006/0177066 A1 | 8/2006 | Han et al. | |
| 2006/0224893 A1 | 10/2006 | Sales et al. | |
| 2006/0288209 A1* | 12/2006 | Vogler | 713/168 |
| 2007/0079362 A1 | 4/2007 | Lortz et al. | |
| 2007/0106894 A1 | 5/2007 | Zhang et al. | |
| 2007/0107020 A1 | 5/2007 | Tavares | |
| 2007/0118879 A1 | 5/2007 | Yeun | |
| 2007/0141986 A1* | 6/2007 | Kuehnel et al. | 455/41.2 |
| 2007/0150720 A1 | 6/2007 | Oh et al. | |
| 2007/0152826 A1 | 7/2007 | August et al. | |
| 2007/0178884 A1 | 8/2007 | Donovan et al. | |
| 2007/0277224 A1 | 11/2007 | Osborn et al. | |
| 2008/0066120 A1 | 3/2008 | Igoe | |
| 2008/0079601 A1 | 4/2008 | Ishihara et al. | |
| 2008/0123739 A1 | 5/2008 | Reznic et al. | |
| 2008/0134309 A1 | 6/2008 | Qin et al. | |
| 2008/0250147 A1* | 10/2008 | Knibbeler et al. | 709/229 |
| 2008/0301436 A1 | 12/2008 | Yao et al. | |
| 2008/0313462 A1 | 12/2008 | Zhao et al. | |
| 2009/0061835 A1 | 3/2009 | Schmidt et al. | |
| 2009/0103471 A1 | 4/2009 | Candelore | |
| 2009/0122201 A1 | 5/2009 | Freundlich et al. | |
| 2009/0132941 A1 | 5/2009 | Pilskalns et al. | |
| 2009/0157521 A1 | 6/2009 | Moren et al. | |
| 2009/0177511 A1 | 7/2009 | Shaw et al. | |
| 2009/0217043 A1 | 8/2009 | Metke et al. | |
| 2009/0235304 A1 | 9/2009 | Hardacker et al. | |
| 2009/0240941 A1 | 9/2009 | Lee et al. | |
| 2009/0241040 A1 | 9/2009 | Mattila et al. | |
| 2009/0247197 A1 | 10/2009 | Graff et al. | |
| 2009/0307492 A1 | 12/2009 | Cao et al. | |
| 2009/0322948 A1 | 12/2009 | Funabiki et al. | |
| 2010/0030904 A1 | 2/2010 | Oda et al. | |
| 2010/0071010 A1 | 3/2010 | Elnathan et al. | |
| 2010/0135259 A1 | 6/2010 | Lee et al. | |
| 2010/0164693 A1 | 7/2010 | Zhang et al. | |
| 2010/0169646 A1 | 7/2010 | Zhang et al. | |
| 2010/0325654 A1 | 12/2010 | Moroney et al. | |
| 2011/0047583 A1 | 2/2011 | Howard et al. | |
| 2011/0268274 A1* | 11/2011 | Qiu et al. | 380/270 |

FOREIGN PATENT DOCUMENTS

| | | |
|---|---|---|
| EP | 1710656 A1 | 10/2006 |
| EP | 1804428 A2 | 7/2007 |
| EP | 1881664 A1 | 1/2008 |
| JP | 2000078669 A | 3/2000 |
| JP | 2001054171 A | 2/2001 |
| JP | 2001523419 A | 11/2001 |
| JP | 2008/035517 A | 2/2008 |
| KR | 100703018 B1 | 10/2006 |
| KR | 10-2006-00113926 A | 11/2006 |
| KR | 10-0778477 B1 | 11/2007 |
| WO | 9818234 A1 | 4/1998 |
| WO | 2007094347 A1 | 8/2007 |
| WO | 2008-002081 A1 | 1/2008 |

OTHER PUBLICATIONS

PCT Search Report & Written Opinion, Re: Application #PCT/US2009/066529; Jun. 28, 2010.

PCT Search Report & Written Opinion, Re: Application #PCT/US2009/065670; Jun. 29, 2010.

PCT Search Report & Written Opinion, Re: Application #PCT/US2009/066178; Jun. 22, 2010.

Menezes, et al, "Handbook of Applied Cryptography", 1996; Chapter 12, pp. 489-541.

Soriente, et al, "BEDA: Button-Enabled Device Association", First International Worshop on Security for Spontaneous Interaction; Sep. 2007.

"Wireless Home Digital Interface," accessed at http://www.whdi.org/Technology/, accessed on Mar. 25, 2010, pp. 2.

Barker, E, and Kelsey, J, "Recommendation for Random Number Generation Using Deterministic Random Bit Generators (Revised)." NISY Special Publication 800-90. pp. 133 (2007).

International Search Report and Written Opinion for International Application No. PCT/US2010/038963, European Patent Office, The Hague, Netherlands, mailed on Sep. 22, 2010.

Japanese Patent Office "Decision of Rejection" for Patent Application No. 2012-516290 dated Aug. 20, 2013, 2 pages.

European Patent Office, "Extended European Search Report" for Patent Application No. 09836637.0 dated Nov. 21, 2013, 5 pages.

United States Patent and Trademark Office, "Non-Final Rejection" for U.S. Appl. No. 12/344,994 dated May 23, 2013, 10 pages.

European Patent Office, "Extended European Search Report" for European Application No. 09836624.8 dated Jul. 19, 2013, 6 pages.

European Patent Office, "Extended European Search Report" for European Application No. 09836653.7 dated Jul. 26, 2013, 7 pages.

United States Patent and Trademark Office, "Notice of Allowance and Fee(s) Due" for U.S. Appl. No. 12/816,817 dated May 14, 2013, 10 pages.

European Patent Office, "Extended European Search Report" for European Application No. 09836638.8 dated Jul. 22, 2013, 8 pages.

The State Intellectual Property Office of the People's Republic of China, "Notification of the Second Office Action" for Chinese Patent Application No. 200980153092.4 dated Feb. 11, 2014, 12 pages translated.

* cited by examiner

PERSONAL IDENTIFICATION NUMBER (PIN) GENERATION BETWEEN TWO DEVICES IN A NETWORK

RELATED APPLICATIONS

The present invention is related to U.S. patent application Ser. No. 12/344,994, filed Dec. 29, 2008, entitled "Method of Targeted Discovery of Devices in a Network", by Jiang Zhang and Petr Peterka; U.S. patent application Ser. No. 12/344,997, filed Dec. 29, 2008, entitled "Secure and Efficient Domain Key Distribution for Device Registration", by Jiang Zhang and Sasha Medvinsky; and U.S. patent application Ser. No. 12/345,002 (now U.S. Pat, No. 8,185,049), filed Dec. 29, 2008, entitled "Multi-Mode Device Registration", by Jiang Zhang and Petr Peterka, all of which are incorporated by reference in their entireties.

BACKGROUND

The WIRELESS HOME DIGITAL INTERFACE (WHDI) is a wireless standard proposed for a wireless multimedia device network, which may be used at home, in the office or in other short-range wireless network environments. WHDI allows for high bandwidth wireless channels for sending content between devices, which may support uncompressed High Definition (HD) content. For example, a DVD player may be connected to multiple HDTVs wirelessly and send uncompressed content to the HDTVs using WHDI. WHDI eliminates the need for cabling, such as High Definition Multimedia Interface (HDMI) cables, component cables, etc., used to transmit uncompressed content between devices. Conventional wireless technologies such as 802.11, BLUETOOTH, etc., do not have the bandwidth or interface to transmit uncompressed multimedia content between devices.

WHDI can be used in various environments. For example, a user located in a single family home or in an apartment may connect a DVD player, an MP3 player, a laptop PC, a gaming console, and flat panel TVs all together, wirelessly, using WHDI. In another environment, a user wirelessly connects a multimedia projector in a conference room to a desktop PC in his office, and to a set of notebook computers of numerous meeting participants using WHDI. In these examples and other examples, security is a concern because of the wireless communication between the WHDI devices. Due to the nature of wireless networks, typically they are easy to identify by unauthorized users. Also, an unauthorized user may attempt to identify and connect to the particular devices connected in a home WHDI network. The homeowner may desire to keep the identity of their devices private, and their devices away from the unauthorized users. For example, a homeowner may not want a neighbor to know they have 5 HDTVs, or they may not want any non-family members to know they have a server connected to their home network, because the server may contain confidential information, such as personal videos, etc. While WHDI provides the protocol and interfaces for high-bandwidth wireless networks, WHDI may lack the security procedures to maintain user privacy.

BRIEF DESCRIPTION OF THE DRAWINGS

Features of the present invention will become apparent to those skilled in the art from the following description with reference to the figures, in which.

DETAILED DESCRIPTION

Figure 1:
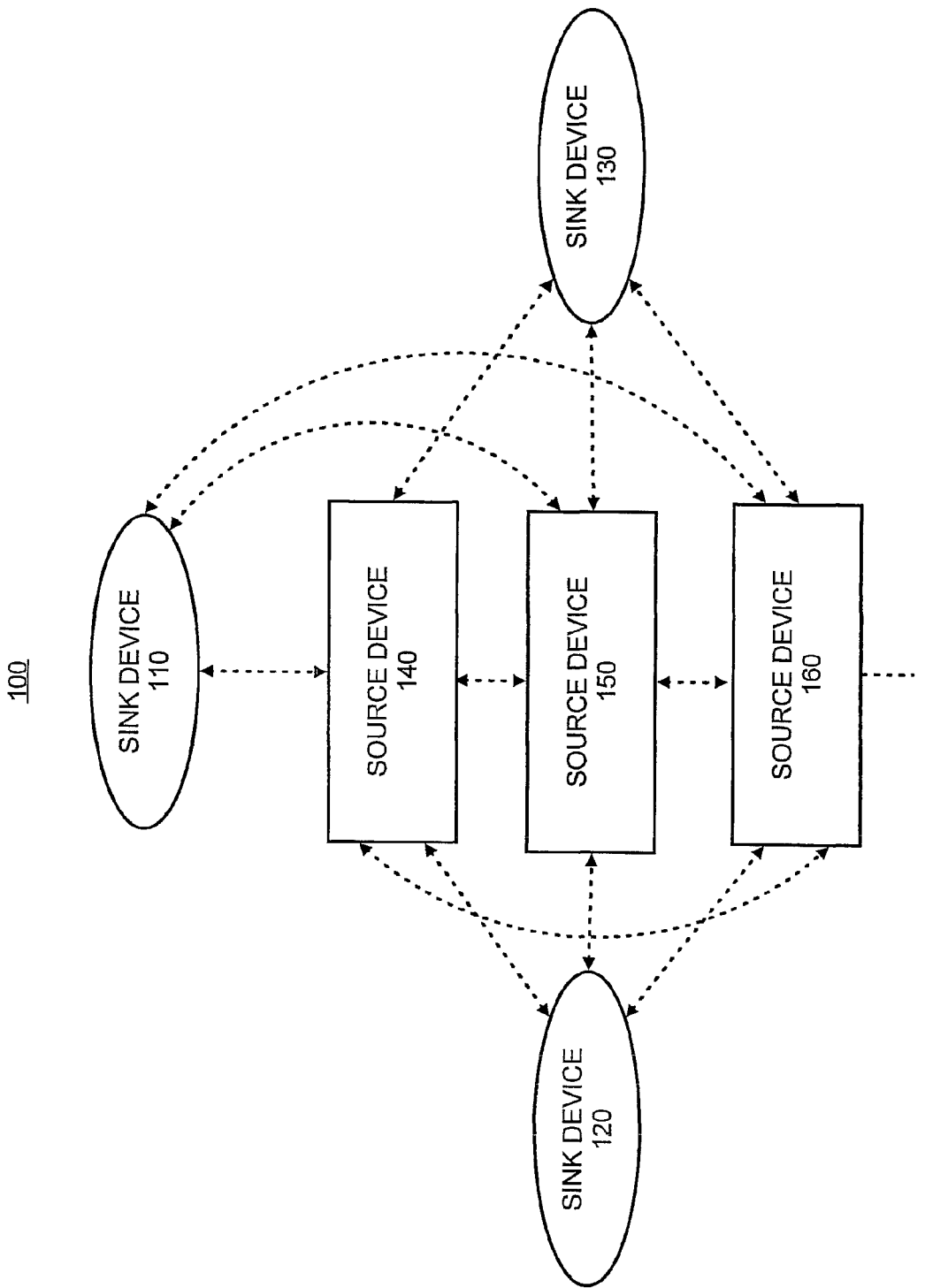
FIG. 1 illustrates a simplified block diagram of a Wireless Home Digital Interface network, according to an embodiment of the present invention.

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

Embodiments of the present invention provide a secure and user-friendly method and system for generating Personal Identification Numbers (PINs) among the different devices in a wireless network, in particular, a WHDI network in which the WHDI environment provides a set of security functions.

WHDI is a proposed standard for high bandwidth wireless digital data connectivity between multiple points. WHDI wirelessly transmits multimedia data, such as high definition video and the associated audio data, from source devices to sink devices in the WHDI network reliably. Devices in a WHDI network are referred to as WHDI devices, and a WHDI network include WHDI devices communicating wirelessly amongst each other using the WHDI standard. WHDI devices are characterized as two types. One type is a source device and the other type is a sink device. A WHDI device may be a source device, a sink device, or both depending on its functionality. A source device transmits data streams across a WHDI network to a sink device, and a sink device receives data streams across the WHDI network from the source device. Examples of source devices are set-top box, notebook Personal Computer (PC), desktop PC, DVD player, MP3 player, video camcorder, audio/video receiver, gaming console, etc. Examples of sink device are TVs, PCs, projectors, etc.

Many device networking technologies including WHDI face the issue of how to securely allow a new device to become part of any existing network. One way of doing this is using a Personal Identification Number (PIN) during a device registration process. The device registration is a process to let a new device join another device or a network of devices in a domain. A domain is a group of devices that are approved to share content with each other. Device registration or domain registration includes the process of approving or denying a device to join other devices, or a domain. Device registration can provide a user with control over which devices are allowed to connect to the other devices in the user's domain. So if a family has a domain, then all the devices owned by the family may be members of the domain, but a friend's device may not be allowed to join the domain.

Prior to a new device being allowed to connect to an existing device or join a domain, the new device must be authorized or pre-approved to ensure that the new device is a device that a user wants to connect to the existing device or be in the domain. For example, a family member purchases a new TV, and the family member wants the TV to become part of the family domain, so the TV can play content received from other devices in the family domain, such as a set-top box or a DVD player. However, if a neighbor purchases a TV, the family member likely does not want the neighbor's TV in the family's domain. Furthermore, through a wireless network, the neighbor's TV may inadvertently attempt to become part of the family domain. In order to limit this possibility, a PIN generation method, according to an embodiment, is described herein to determine whether a new device is authorized to join a domain. The PIN may also be used to generate a device registration key, which is used to securely distribute the domain key that is used by the new device to join the domain.

FIG. 1 illustrates a simplified block diagram of a WHDI network 100 configured to generate a PIN among different WHDI devices, according to an embodiment of the present invention. FIG. 1 shows a set of sink devices including a sink device 110, a sink device 120, and a sink device 130, and a set of source devices including a source device 140, a source device 150, and a source device 160. In one embodiment, the sink device 110 is a flat panel HDTV in a living room, the sink device 120 is a TV in a kitchen, such as a TV installed on a refrigerator, and the sink device 130 is a TV for a treadmill. Further, the source device 140 is a notebook PC, the source device 150 is DVD player, and the source device 160 is a gaming console. It will be apparent that the WHDI network 100 may include additional sink devices and/or additional source devices not shown and that some of the sink devices and the source device described herein maybe removed or new WHDI devices added.

The source devices 140, 150, and 160, respectively, may be any source of content, such as a video content, audio content, or other data content from the Internet. Each of the source devices 140, 150, and 160 may have independent and possibly different content. In addition, each of the source devices 140, 150, and 160 may have a different connectivity with each of the sink devices 110, 120, and 130. Any one of the source devices 140, 150, and 160 may be connected to one or more of the sink devices 110, 120, and 130 simultaneously (e.g., for multicasting) or separately (e.g., unicasting).

When the source device 140 attempts to connect to the sink device 110 wirelessly within the WHDI network 100 for the first time, the sink device 110 needs to know whether the source device 140 is a secure device for the sink device 110. And at the same time, the source device 140 also needs to know whether the sink device 110 is a secure device for the source device 140. Secure device means that the device is a WHDI standard compliant device and the device is authorized to connect to the other device. Whether a device is a WHDI standard compliant device can be verified by an existence of a valid WHDI PKI (Public Key Infrastructure) certificate, which was issued by the WHDI certificate authority to the device. Even with a valid certificate, however, a device must still be "authorized" to be a secure device. For example, if the source device 140 is a media player belonging to your neighbor, who wants to stream data of an adult content or an unsolicited advertisement to your HDTV while you are watching a DISNEY channel with kids, the source device 140 would not be considered to be a secure device for the sink device 110.

One way of verifying whether the source device 140 is a secure device for the sink device 110 is that the source device 140 provides its valid WHDI device certificate to the sink device 110 and the sink device 110 generates a PIN for the source device 140 using a method described in further detail below. For example, PIN generation can be accomplished by entering any input choices, such as pressing particular buttons on the source device 140, pressing buttons in a particular sequence on the source device 140, etc., following one or more instructions from the sink device 110. This way, a user who wants to connect a new source device to an existing WHDI device has a simplified method of a PIN generation and entry for the existing WHDI device, for example, by using the interface on the WHDI device. It is more secure and user-friendly to let the devices generate a PIN at runtime than using a specific PIN already pre-assigned for a particular source device, because it reduces the possibility of the PIN being stolen or the PIN being forgotten by the user. With respect to the certificate validation, a WHDI device is initially loaded with a certificate in the factory as well as the device's identification. Thus, the WHDI device certificates of both devices have to be validated first. After validating the other device's certificate, any device can use that other device's public key (included in the certificate) to encrypt and protect the data transmitted between these two devices.

In FIG. 1, the sink device 110 generates a PIN for the source device 140 based on the type of inputs at the source device 140, such as press-able buttons, or other user input options. The source device 140 can also take part in the PIN generation process by providing some random values to the sink device 110. These random data can be encrypted using the sink device 110's public key and the sink device 110 can decrypt it using its own private key. Once the sink device 110 generates a PIN for the source device 140, the PIN or information needed to generate the PIN is communicated to the source device 140 through the user. After the sink device generates the PIN, and indicates the user entries, and they are entered at the source device, and the source device generated PIN is the same as the PIN generated at the sink device, the devices may register with each other and the new device may join the existing domain in the WHDI network 100. The domain is used in WHDI to define one or more WHDI devices that a particular WHDI device is authorized to send and/or receive content. This entire PIN generation process is a user friendly and secure method. This method may be performed using a Graphical User Interface (GUI) displayed on one or more of the WHDI devices. Also, an administrative GUI may be provided to manage domains.

The WHDI network 100 also provides the ability to stream the persistently-stored content from the initial source device to another sink device, or from the initial source device to another source device that has been authenticated as part of the WHDI network. In one embodiment, this allows a media server as a source device, e.g., a dual-tuner set-top box ("STB") with hard drive, to deliver recorded content to any sink device such as TV, in the house by streaming to a targeted sink device such as HDTV. Of course, it is noted that while a home network is described, extensions to a business, education, public entertainment or other such local wireless network are analogous.

It will be apparent that the WHDI network 100 may include additional elements not shown and that some of the elements described herein may be removed, substituted and/or modified without departing from the scope of the WHDI network system 100. It should also be apparent that one or more of the elements described in the embodiment of FIG. 1 may be optional.

An embodiment of a method in which the WHDI network 100 may be employed for generating a PIN among different WHDI devices will now be described with respect to the following flow diagram of the method 200 depicted in FIG. 2. It should be apparent to those of ordinary skill in the art that the method 200 represents a generalized illustration and that other steps may be added or existing steps may be removed, modified or rearranged without departing from the scopes of the method 200. Also, the method 200 is described with respect to the WHDI network 100 by way of example and not limitation, and the method 200 may be used in other systems.

Some or all of the operations set forth in the method 200 may be contained as one or more computer programs stored in any desired computer readable medium and executed by a processor on a computer system. Exemplary computer readable media that may be used to store software operable to implement the present invention include but are not limited to conventional computer system Random Access Memory (RAM), Read Only Memory (ROM), Electrically Programmable Read Only Memory (EPROM), Electrically Erasable Programmable Read Only Memory (EEPROM), hard disks, or other data storage devices.

Figure 2:
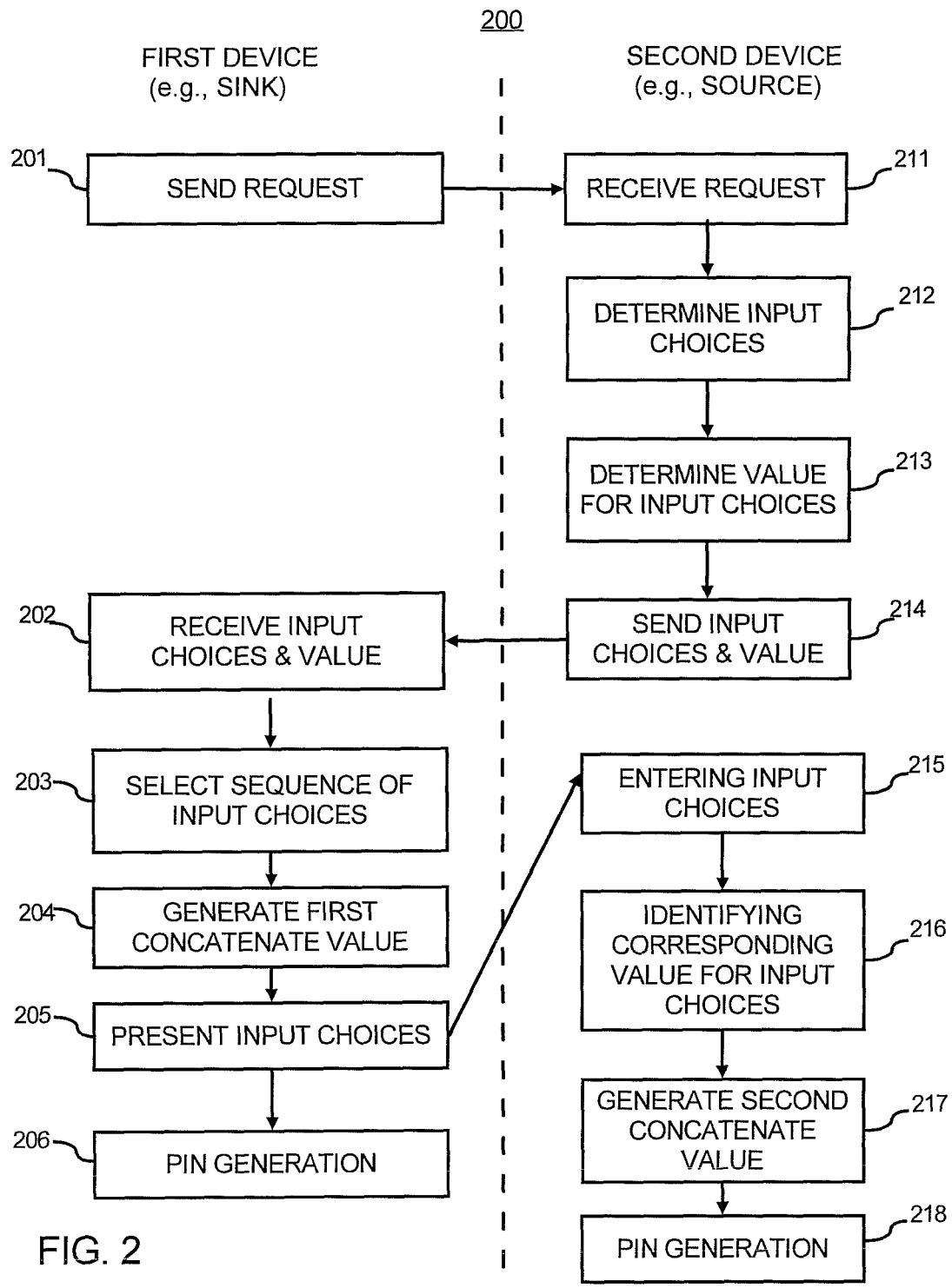
FIG. 2 illustrates a flow diagram of a method for generating and entering a PIN between a first device and a second device in a wireless network, according to an embodiment of the present invention.

FIG. 2 illustrates a flow diagram of a method 200 for generating a PIN between a first device and a second device in a wireless network, according to an embodiment of the present invention. In one embodiment, the wireless network is a WHDI network including end user home or office devices. Therefore, in one embodiment, the first device may be a sink device and the second device may be a source device in FIG. 1, which is configured to generate a PIN. The method 200 may be provided to other non-WHDI networks, which are wireless or wired.

Also, FIG. 2 shows steps performed by a first device and a second device to generate a PIN. In one embodiment, the first device is a sink device and the second device is a source device, such as the sink and source devices described with respect to FIG. 1 in a WHDI network.

At step 201, the first device sends a request to the second device. The request is a message that invokes the PIN generation method 200. Although the step 201 can be an option, the first device's certificate is sent to the second device when the first device sends a request to the second device and the second device uses the public key in the certificate to encrypt the random values for the button list in the following steps. So the encryption key may be included in the request. If the second device is already registered to the first device, the second device may reply to the first device with a message authenticated by the previously shared registration key so that the first device can recognize the second device as an option, or the second device may allow the registration process to continue and overwrite the old registration data if the new registration succeeds. If the second device is not registered to the first device, it means that the first device may not have generated a PIN for the second device previously and the second device does not have a registration key for connecting to the first device and further to the WHDI network, which the first device belongs to. When the second device is not registered to the first device, it shall proceed to the next step. In one embodiment, once the second device receives the request for the registration and replies, the second device may enable its buttons for the directed user entry mode for a predetermined period until the button(s) is pressed, otherwise it times out. During the user entry mode, the buttons shall be considered being used for that purpose only. For each WHDI source device, it is possible that the manufacturer may specify a list of buttons and button names that can be used for user entry and subsequent PIN generation.

At step 211, the second device receives the request. The received request, for example, places the second device in a user entry mode, where buttons or other manual inputs on the second device are used for PIN generation.

At step 212, the second device determines input choices, and at step 213, the second device determines values for each input choice. An input choice is information that can be input into the second device. The input choice typically is information that can be manually entered into the second device. In one example, the input choices are associated with buttons on the second device. Examples of input choices of the second device are a set of keypad or button list for function keys, such as "PLAY", "STOP", "PAUSE", and "ENTER" depends on the type of the second device. For example, a DVD player as a second device may have buttons for "PLAY", "STOP", and "PAUSE" that are input choices. In another example, a notebook PC may use keys on its keyboard as input choices. Another example of an input choice may be a number of clicks of a button. Such as 3 clicks on PLAY and 2 clicks on PAUSE.

A value is determined for each input choice. Each value may be a random number. Each value may be generated by the second device, for example, using a random number generator, or pre-stored in the second device, such as during the manufacture process.

In one example, the input choices and values are comprised of a button list. The button list includes a button name and value for each button of a set of buttons on the second device. One example of a button list is {(PLAY, 10), (PAUSE,13), (STOP, 24)}.

At step 214, the second device transmits the input choices and corresponding values to the first device. The transmission should be secured, for example, by encrypting the information being transmitted, so that any other party cannot see the information. For example, when a button list is transmitted to the first device over the WHDI network, if the first device has sent its WHDI device certificate to the second device, the second device may use the first device's public key, which it obtained from the certificate, to encrypt the input choices information. The second device may keep the input choices and corresponding values until the registration process is over.

At step 202, the first device receives the input choices and corresponding values from the second device. If the information is encrypted, the first device must decrypt it first. For example, the button list is received from the second device and the first device must use its private key to decrypt the information first.

At step 203, the first device selects a sequence of the input choices. The sequence may be selected randomly. For example, if the button list is {(PLAY, 10), (PAUSE,13), (STOP, 24)}, the first device selects a random sequence of the buttons, such as {(STOP, 24), (PLAY, 10), (PAUSE,13)}. The number of input choices in the sequence can also be determined by the first device randomly. Also, an input choice can be repeated multiple times or not used at all in the sequence.

At step 204, the first device generates a first concatenated value from the values in the selected sequence. There are various ways to concatenate such values. For example, the sequence is STOP, PLAY, PAUSE. The corresponding values are 24, 10, and 13, respectively. The first concatenated value could be 241013, or the values can be concatenated in binary values, or the values can be concatenated after a transformation, such as adding a number (e.g. 5) to each value, as long as both devices do the same transformation. This step may be performed anytime after the sequence is selected.

At step 205, the first device presents only the input choices, and not the corresponding values, in the selected sequence. In one embodiment, the presentation of the sequence may include an audio or visual presentation. For example, if the first device is a TV, the TV displays the sequence of STOP, PLAY, PAUSE. Thus, the presentation can be to a user.

At step 215, the input choices are entered in the second device. This may include manual entry. For example, the user views the displayed sequence of STOP, PLAY, PAUSE, and pushes STOP, PLAY, PAUSE buttons in that order on the second device.

At step 216, the second device identifies the corresponding value for each input choice. For example, the button list is stored in the second device and is retrieved to determine the corresponding value for each input choice.

At step 217, the second device generates a second concatenated value from the values in the sequence of the entered input choices. For example, the sequence is STOP, PLAY, PAUSE. The corresponding values are 24, 10, and 13, respectively. The second concatenated value is 241013. Also there are many ways to concatenate the values with or without transformation, as long as both devices use the same approach.

The concatenated values formed at the first and second devices are the PINs. In other words, each device calculates its own PIN as represented by steps 206 and 218. If both devices generate the same PIN, then one device would be allowed to become a member of the domain or connect to the other device. There are many methods to verify whether these two devices generate the same PIN. The second device may send the PIN back to the first device securely for the first device to verify directly, or the second device may send some data derived from the PIN to the first device for the first device to verify indirectly. In one embodiment, the second device may derive a device registration key from the PIN generated by its own, or from the PIN and some other secret data shared between these two devices, and then use the derived key to generate a Message Authentication Code (MAC) over an acknowledgement message sent back to the first device. After receiving the acknowledgement message with the MAC from the second device, the first device will use the PIN generated by its own, or use the PIN with some other secret data shared between the two devices, to derive a device registration key, and then use the derived key to verify the acknowledgement message's MAC. If the MAC is verified, this means the second device has generated the right PIN to derive the right key. Thus, the PINs generated by these two devices are indirectly verified to be same. If the MAC verification failed, this means the PIN generated by the second device may not be same as the PIN the first device generated. If so, the PIN verification failed and these two devices may not be able to connect with each other to share content. The user may restart the process again to make the PIN verification successful, such that the first device and second device may effectively belong to the same domain or connect to each other, and can communicate further.

In another embodiment, after step 203, the first device presents the sequence of input choices to the second device. The presented input choices are entered in the second device. The second device securely sends the entered input choices to the first device, e.g. the entered choices may be encrypted using a key shared by these two devices. If the entered input choices match the input choices presented, then the PINs are verified and the two devices may communicate further, e.g. a device registration key can be exchanged and stored by the two devices for future communication. In this embodiment, a PIN does not need to be generated by concatenating information for the input choices. Instead, the input choices selected at the first device and presented to the second device are the PIN. Also, note that the input choices selected at the first device in this embodiment or the embodiments described above can be a subset of the input choices received from step 214.

As described above, the button list includes input choice, value pairs. In another embodiment, the button list does not include values, and may only include the input choices, such as only a set of buttons on the second device. Then the first device can select and display a sequence of the input choices and use this sequence in some fashion to generate a PIN. The second device, after having the input choices entered by a user in the correct sequence, can also use a matching approach to generate the PIN.

Note that the method 200 provides security because a user of an unauthorized first device would not be able to access the second device and enter the input choices to generate the same PIN on the second device using the method 200.

In one embodiment, the components of the WHDI network 100 in FIG. 1 can be grouped into subsystems. These WHDI subsystems interact with other devices throughout the system, including source devices and their accompanying sink devices, to share the content resident within or sent to the WHDI network 100.

Figure 3:
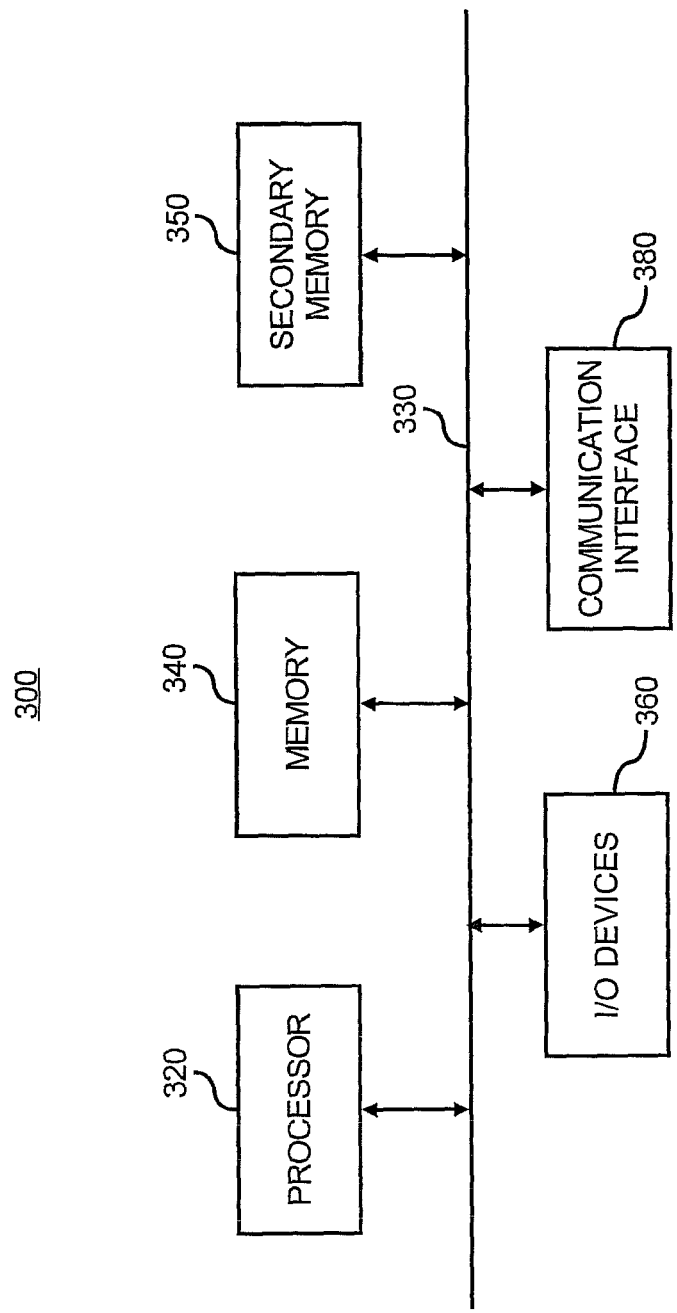
FIG. 3 shows a block diagram of a computer system that may be used as a platform for devices shown in FIG. 1, according to an embodiment of the present invention.

FIG. 3 shows the block diagram of a computer system 300 that may be used as a platform for a first device, second device, source device, or a sink device. The computer system 300 may also be used to execute one or more computer programs performing the method, steps and functions described herein.

The computer system 300 includes a processor 320, providing an execution platform for executing software. Commands and data from the processor 320 are communicated over a communication bus 330. The computer system 300 also includes a main memory 340, such as a Random Access Memory (RAM), where software may reside during runtime, and a secondary memory 350. The secondary memory 350 may include, for example, a nonvolatile memory where a copy of software is stored. In one example, the secondary memory 350 also includes ROM (read only memory), EPROM (erasable, programmable ROM), EEPROM (electrically erasable, programmable ROM), and other data storage devices, include hard disks.

The computer system 300 includes I/O devices 360. The I/O devices 360 may include a display and/or user interfaces comprising one or more I/O devices, such as a keyboard, a mouse, a stylus, speaker, and the like. A communication interface 380 is provided for communicating with other components. The communication interface 380 may be a wired or a wireless interface. The communication interface 380 may be a network interface.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are mean in their broadest reasonable sense unless otherwise indicated.

What is claimed is:

1. A method of generating, a Personal Identification Number (PIN) between a first device and a second device in a network, the method comprising:

at the first device, wirelessly and securely receiving information indicative of one or more manual input choices of the second device;

at the first device, generating the PIN from the information for the one or more manual input choices of the second device;

at the first device, providing instructions directing an entry of the one or more manual input choices on the second device, wherein the instructions are provided as at least one of an audio presentation and a visual presentation; and at the second device, entering one or more manual input choices in response to the instructions provided by the first device, wherein the second device is operable to generate the same PIN from the entered one or more manual input choices if the entered one or more manual input choices are entered as instructed.

2. The method of claim 1, wherein the information for the one or more input choices further includes numbers assigned to the input choices, and at the first device, generating the PIN further comprises:

generating the PIN from the one or more input choices and the numbers assigned to the input choices.

3. The method of claim 2, wherein the second device is operable to generate the PIN from the entered input choices and the numbers assigned to the input choices.

4. The method of claim 3, wherein the numbers assigned to the input choices are random numbers.

5. The method of claim 4, wherein the random numbers include a random number generated for each input choice and generating the PIN from the random numbers further comprises:

determining a random sequence of the one or more input choices, wherein the random sequence includes a sequence of input choice, random number pairs; and determining the PIN from the random sequence.

6. The method of claim 1, further comprising:

at the first device, verifying whether the input choices entered on the second device are the same input choices in the instructions, wherein the PIN is verified when the input choices are the same.

7. The method of claim 1, wherein the entry of the input choices is performed manually on the second device.

8. The method of claim 1, wherein the input choices comprise a set of manually-activated buttons on the second device.

9. The method of claim 1, wherein the input choices comprise a set of buttons or a number of clicks of at least one button on the second device.

10. The method of claim 1, wherein the network is a Wireless Home Digital Interface (WHDI) network including end user home devices.

11. The method of claim 1, further comprising:
concatenating the numbers to generate the PIN.

12. The method of claim 11, further comprising: transforming or modifying the numbers before being concatenated.

13. The method of claim 1, further comprising:
sending a request to the second device from the first device before receiving the information including the input choices of the second device.

14. The method of claim 1, wherein the first device and the second device are a sink device and a source device respectively, or the first device and the second device are a source device and a source device respectively.

15. At least one non-transitory computer readable storage medium storing at least one computer program that when executed performs a method of generating a Personal Identification Number (PIN) between a first device and a second device in a network, the method comprising:

at the first device, wirelessly and securely receiving information indicative of one or more manual input choices of the second device;

at the first device, generating the PIN from the information for the one or more manual input choices of the second device;

at the first device, providing instructions directing an entry of the one or more manual input choices on the second device, wherein the instructions are provided as at least one of an audio presentation and a visual presentation; and at the second device, entering one or more manual input choices in response to the instructions provided by the first device, wherein the second device is operable to generate the same PIN from the entered one or more manual input choices if the entered one or more manual input choices are entered as instructed.

16. The at least one non-transitory computer readable medium of claim 15, wherein the information for the one or more input choices further includes numbers assigned to the input choices, and at the first device, generating the PIN further comprises:

generating the PIN from the one or more input choices and the numbers assigned to the input choices.

17. The at least one non-transitory computer readable medium of claim 15, wherein the wherein the second device is operable to generate the PIN from the entered input choices and the numbers assigned to the input choices.

* * * * *